United States Patent
Chino et al.

(10) Patent No.: US 10,505,879 B2
(45) Date of Patent: Dec. 10, 2019

(54) COMMUNICATION SUPPORT DEVICE, COMMUNICATION SUPPORT METHOD, AND COMPUTER PROGRAM PRODUCT

(71) Applicant: Kabushiki Kaisha Toshiba, Minato-ku, Tokyo (JP)

(72) Inventors: Tetsuro Chino, Kawasaki Kanagawa (JP); Shoko Miyamori, Kawasaki Kanagawa (JP); Kouji Ueno, Shinagawa Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 15/385,498

(22) Filed: Dec. 20, 2016

(65) Prior Publication Data
US 2017/0195278 A1   Jul. 6, 2017

(30) Foreign Application Priority Data
Jan. 5, 2016   (JP) .................... 2016-000489

(51) Int. Cl.
*H04L 12/58* (2006.01)

(52) U.S. Cl.
CPC .................... *H04L 51/16* (2013.01)

(58) Field of Classification Search
CPC ......... H04L 51/16; H04L 51/24; H04L 51/34; H04L 51/38; H04L 12/1827; H04L 51/04
See application file for complete search history.

(56) References Cited

U.S. PATENT DOCUMENTS

| | | | |
|---|---|---|---|
| 7,426,540 B1 | 9/2008 | Matsumoto et al. | |
| 8,645,469 B2 | 2/2014 | Chi et al. | |
| 9,002,706 B2 * | 4/2015 | Lopez | B66B 13/26 704/246 |
| 9,652,738 B2 * | 5/2017 | Bentley | H04L 12/1822 |
| 2008/0028027 A1 | 1/2008 | Jachner | |
| 2008/0189623 A1 * | 8/2008 | Patil | H04L 12/1827 715/753 |

(Continued)

FOREIGN PATENT DOCUMENTS

| | | |
|---|---|---|
| JP | 2001-027982 A | 1/2001 |
| JP | 2007-042137 A | 2/2007 |

(Continued)

OTHER PUBLICATIONS

"Press Release" [online], Retrieved on Nov. 24, 2016 from http://www.jaist.ac.jp/whatsnew/press/2013/10/post_380.html , Oct. 31, 2013.

(Continued)

*Primary Examiner* — Todd L Barker
(74) *Attorney, Agent, or Firm* — Knobbe, Martens, Olson & Bear, LLP

(57) ABSTRACT

A communication support device performs communication with a plurality of terminal devices. The communication support device includes an acquirer, a changer, and a deliverer. The acquirer acquires messages from the terminal devices. The changer changes, on the acquired message, a delivery mode of the message to the delivery mode that eliminates confusion when the message has a possibility of causing the confusion. The deliverer delivers the message to the terminal devices in the delivery mode that is changed.

5 Claims, 7 Drawing Sheets

(56) References Cited

U.S. PATENT DOCUMENTS

| | | |
|---|---|---|
| 2012/0265575 A1 | 10/2012 | Torii et al. |
| 2013/0211818 A1 | 8/2013 | Sakamoto et al. |
| 2015/0248886 A1* | 9/2015 | Sarikaya ............. G10L 15/1815 704/257 |
| 2015/0310877 A1* | 10/2015 | Onishi .................... H04M 3/51 704/246 |
| 2015/0340026 A1* | 11/2015 | Maxwell, III .......... G10L 15/08 704/254 |
| 2016/0225370 A1* | 8/2016 | Kannan .................... G10L 15/22 |
| 2016/0316062 A1 | 10/2016 | Miyamori et al. |
| 2017/0169829 A1* | 6/2017 | Celikyilmaz ....... G06F 17/2785 |

FOREIGN PATENT DOCUMENTS

| | | |
|---|---|---|
| JP | 2008-192141 A | 8/2008 |
| JP | 2009-193217 A | 8/2009 |
| JP | 2009-545074 A | 12/2009 |
| JP | 5166569 B2 | 3/2013 |
| JP | 2013-164515 A | 8/2013 |
| JP | 2014-063054 A | 10/2014 |
| JP | 2015-090870 A | 5/2015 |
| JP | 2016-208420 A | 12/2016 |

OTHER PUBLICATIONS

"Heath care IT promotion part e health solution part" [online], [retrieved on Nov. 24, 2016] Retrieved from http://www.chubu.meti.go.jp/b34jyoho/shiryo/20140912yugosecurityseminar/20140912toshiba.pdf Sep. 12, 2014.

Tatsuya Kawahara & Masahiro Araki, "B-2 Analyzing Method of Speech Dialog Corpus", in Science of Intelligence, Speech Dialog System, Japanese Society of Artificial Intelligence, "Chi no Kagaku" series, pp. 164-171, ISBN4-274-20305-0, Ohm-sha, Oct. 15, 2006.

Masato Ishizaki & Yasuharu Den, "Dialog Structure Based on Interaction", Language and Computation 3, Discourse and Dialog, vol. 3, Table 6.1, pp. 139 ISBN4-13-965403-9, Mar. 23, 2001.

\* cited by examiner

| INTENTION ||
|---|---|
| PRECEDING MESSAGE | RESPONSE MESSAGE |
| QUESTION A | REPLY A |
| QUESTION B | REPLY B |
| REQUEST | CONSENT |
| REQUEST | REJECTION |
| ⋮ | ⋮ |
| ⋮ | ⋮ |

| INTENTION ||
|---|---|
| PRECEDING MESSAGE | RESPONSE MESSAGE |
| QUESTION | QUESTION |
| QUESTION | REQUEST |
| CONSENT | REJECTION |
| ⋮ | ⋮ |
| ⋮ | ⋮ |

| USER ID | MESSAGE ID | MESSAGE | ACQUISITION TIME | INTENTION | DISTINCTION RESULT | UTTERANCE PAIR HISTORY | DELIVERY STATUS | DELIVERY MODE |
|---|---|---|---|---|---|---|---|---|
| USER 1 | m1 | ISN'T THERE A RED BLOCK? | 14:10:45 | QUESTION | OK | [m1/ ] | DELIVERED | IMMEDIATE DELIVERY (m1) > others |
| USER 2 | m2 | IT'S IN THE ROOM B | 14:10:50 | REPLY | OK | [m1/m2] | DELIVERED | IMMEDIATE DELIVERY (m2) > others |
| USER 3 | m3 | WHERE IS A LONG BLUE BLOCK? | 14:11:00 | QUESTION | OK | [m1/m2], [m3/ ] | DELIVERED | IMMEDIATE DELIVERY (m3) > others |
| USER 4 | m4 | DOESN'T ANYONE HAVE A SHORT GREEN ONE? | 14:11:02 | QUESTION | NG | [m1/m2], [m3/ ], [m4/ ] | PENDING | TEMPORARY HOLDING (m4) |
|  | s1 | MESSAGE "DOESN'T ANYONE HAVE A SHORT GREEN ONE?" IS TEMPORARILY HELD | - | - | - | - | DELIVERED | Feedback > user4 |
| USER 5 | m5 | IT'S IN THE ROOM C | 14:11:10 | REPLY | OK | [m1/m2], [m3/m5], [m4/ ] | DELIVERED | IMMEDIATE DELIVERY (m5) > others |
| USER 4 | m4 | DOESN'T ANYONE HAVE A SHORT GREEN ONE? | - | QUESTION | OK | [m1/m2], [m3/m5], [m4/ ] | DELIVERED | DEFERRED DELIVERY (m4) > others |
|  | s2 | MESSAGE "DOESN'T ANYONE HAVE A SHORT GREEN ONE?" WAS DELIVERED BEING DEFERRED | - | - | - | - | DELIVERED | Feedback > user4 |
| USER 6 | m6 | IT'S IN THE ROOM B | 14:12:00 | REPLY | OK | [m1/m2], [m3/m5], [m4/m6] | DELIVERED | IMMEDIATE DELIVERY (m6) > others |

| USER ID | MESSAGE ID | MESSAGE |
|---|---|---|
| USER 1 | m1 | ISN'T THERE A RED BLOCK? |
| USER 2 | m2 | IT'S IN THE ROOM B |
| USER 3 | m3 | WHERE IS A LONG BLUE BLOCK? |
| USER 4 | m4 | DOESN'T ANYONE HAVE A SHORT GREEN ONE? |
| USER 5 | m5 | IT'S IN THE ROOM C |
| USER 6 | m6 | IT'S IN THE ROOM B |

COMMUNICATION SUPPORT DEVICE, COMMUNICATION SUPPORT METHOD, AND COMPUTER PROGRAM PRODUCT

CROSS-REFERENCE TO RELATED APPLICATIONS

This application is based upon and claims the benefit of priority from Japanese Patent Application No. 2016-000489, filed on Jan. 5, 2016; the entire contents of which are incorporated herein by reference.

FIELD

An embodiment described herein relates generally to a communication support device, a communication support method, and a computer program product.

BACKGROUND

A system that supports communication among a plurality of users by delivering a message originated by a user to the multiple other users has been known. For example, systems that automatically deliver and reproduce a message originated by a user to mobile terminals of other users have been known.

Conventionally, however, the message originated from a mobile terminal of one user was delivered to each of the mobile terminals of the other users in sequence in order of origination. Thus, on the user side that the messages were delivered, it may be difficult to understand the corresponding relation among the respective messages. This makes it difficult for the conventional technologies to support smooth communication.

BRIEF DESCRIPTION OF THE DRAWINGS

FIG. 3 is a schematic diagram illustrating an exemplary data configuration of normal utterance pair information;

FIG. 4 is a schematic diagram illustrating an exemplary data configuration of abnormal utterance pair information;

FIG. 5 is a schematic diagram illustrating an exemplary data configuration of history information;

DETAILED DESCRIPTION

According to one embodiment, a communication support device performs communication with a plurality of terminal devices. The communication support device comprising a hardware processor configured to receive messages from the plurality of terminal devices change a first delivery mode of a received message to a second delivery mode that eliminates confusion when the received message has a possibility of causing the confusion and deliver the received message to the plurality of terminal devices using the second delivery mode.

A communication support device, a communication support method, and a computer program product will now be described in detail with reference to the appended drawings.

A communication support system according to a present embodiment provides a message to a user. The provision of a message includes providing a message received from one user to other users, providing a message received from one user to the one user, and providing a message received from one user to the one user and the other users. The communication support system according to the present embodiment is applicable also to situations where a physical action, or an operation of an apparatus or the like is needed. For example, the communication support system can be introduced to a production site, a medical site, a care giving site, a machine maintenance site, a sales site, and any other site.

Figure 1:
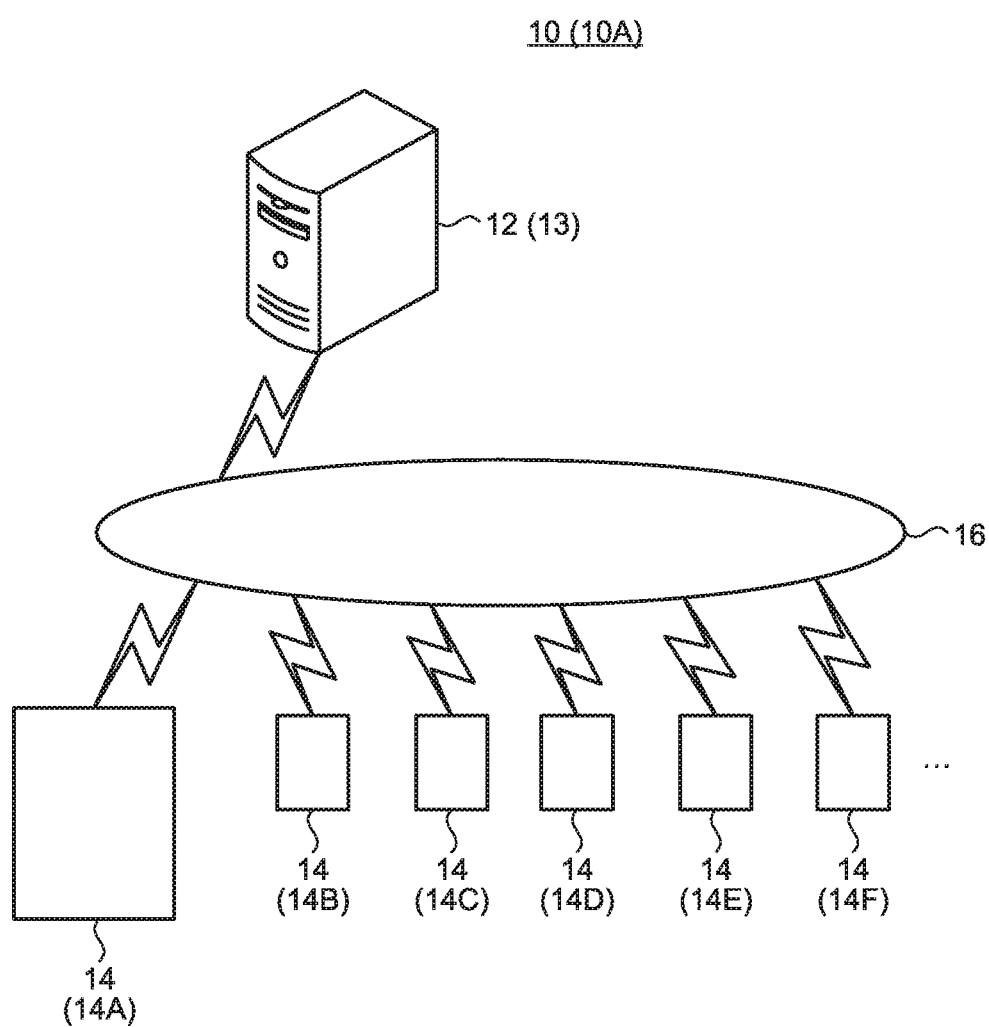
FIG. 1 is a schematic diagram illustrating one example of a communication support system.

FIG. 1 is a schematic diagram illustrating one example of a communication support system 10 according to the present embodiment. The communication support system 10 includes a communication support device 12 and a plurality of terminal devices 14. The communication support device 12 and each of the terminal devices 14 are connected to one another over a network 16. The network 16 is a known communication network. Examples of the network 16 include the Internet and a mobile telephone. The network 16 may be implemented by, for example, a cable, a transceiver, a router, a switch, a wireless local access network (LAN) access point, a wireless LAN transmitter receiver, and other devices.

In the following description, the communication support device 12 is referred to as a support device 12. The support device 12 is a device for managing the communication support system 10. The support device 12 can be a personal computer (PC). The support device 12 stores therein a message acquired from the terminal device 14. The support device 12 also notifies the terminal device 14 and other terminal devices 14 of the message.

The terminal device 14 is operated by a user who uses the communication support system 10. According to the present embodiment, the communication support system 10 includes a plurality of terminal devices 14. In FIG. 1, as the terminal devices 14, six terminal devices 14 of a terminal device 14A to a terminal device 14F are illustrated as one example. However, the number of the terminal devices 14 provided in the communication support system 10 is not limited to six. In the following description, a plurality of terminal devices 14 (the terminal devices 14A to 14F) are simply referred to as the terminal device 14 when the terminal devices 14 are collectively described.

The present embodiment provides exemplary description in which each of the terminal devices 14 is carried by users different from one another.

The user originates a message by using the terminal device 14. The user also checks a message on the terminal device 14. Examples of the terminal device 14 include a PC and a mobile terminal. The present embodiment provides an exemplary description in which the terminal device 14 is a mobile terminal that is carried by a user.

The message is data that the support device 12 receives from the terminal device 14. Furthermore, the message is data that the support device 12 delivers to the terminal device 14. The message is target data that a user of originating the message notifies the user and other users. Examples of the message include voice data and video data. The message may be voice data or video data into which a signal indicative of various button operations that are input to the terminal device 14 by the operating instructions from a user is converted.

The present embodiment provides exemplary description in which a message is voice data.

Figure 2:
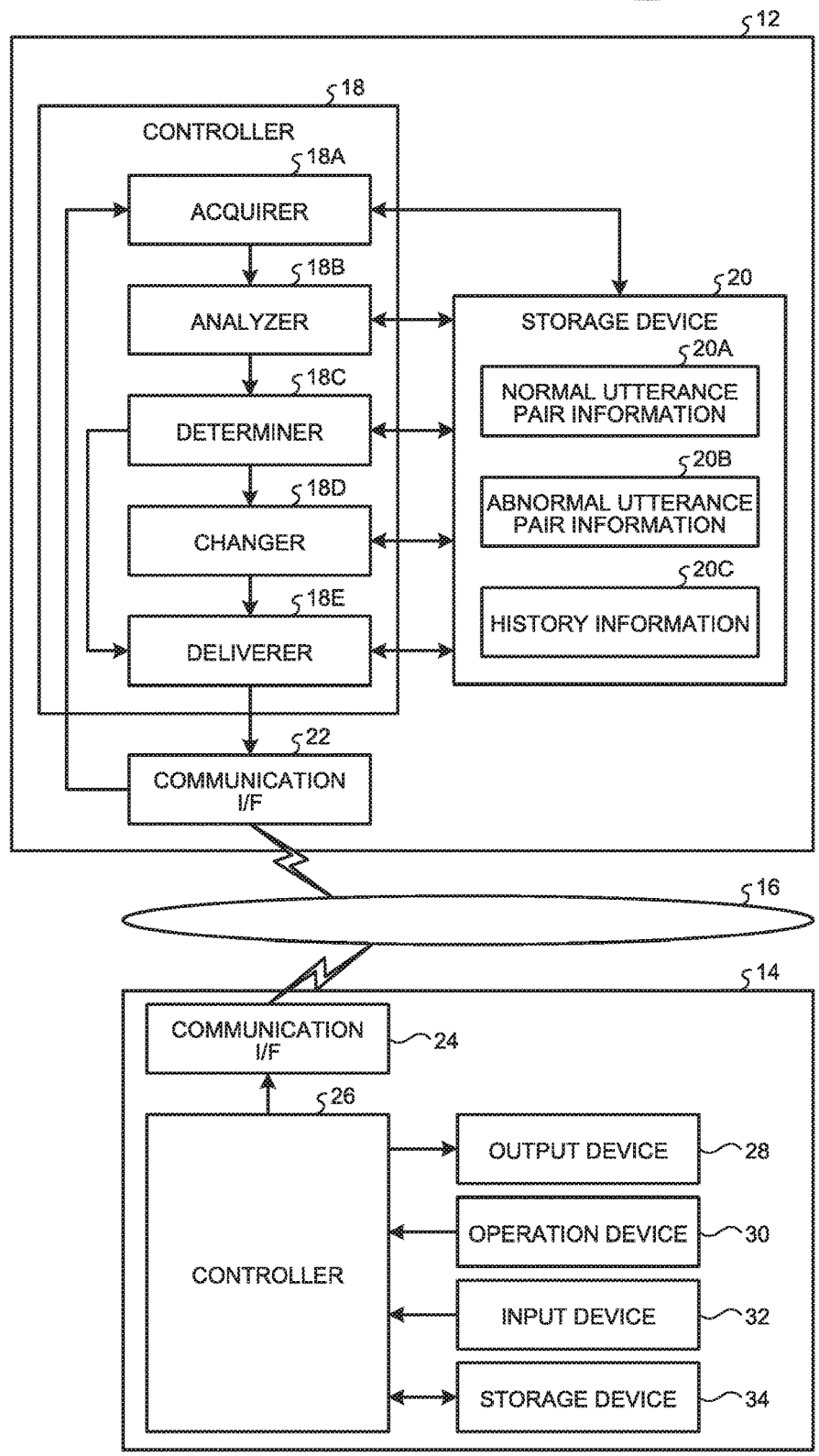
FIG. 2 is a functional block diagram illustrating the communication support system.

FIG. 2 is a functional block diagram illustrating the communication support system 10.

First, the following describes the support device 12. The support device 12 includes a controller 18, a storage device 20, and a communication interface (I/F) 22. The storage device 20 and the communication I/F 22 are connected to the controller 18 in such a manner that data and signals can be exchanged.

The communication I/F 22 communicates with the terminal devices 14, an external device, and other devices over the network 16 in a wireless or wired manner.

The storage device 20 stores therein various data. The storage device 20 is a known storage medium such as a hard disk. According to the present embodiment, the storage device 20 stores therein normal utterance pair information 20A, abnormal utterance pair information 20B, history information 20C, and others.

The storage device 20 stores therein the normal utterance pair information 20A and the abnormal utterance pair information 20B in advance. The normal utterance pair information 20A and the abnormal utterance pair information 20B may be allowed to be modified according to an operating instruction and other actions from a user as appropriate. The history information 20C is updated as appropriate by processing performed by the controller 18 which will be described later.

The normal utterance pair information 20A is information indicative of a normal utterance pair. According to the present embodiment, "normal" indicates that it does not cause confusion for users.

The utterance pair indicates a configuration unit of messages that configure a conversation. In other words, the utterance pair indicates reciprocating exchanges that configure a conversation, that is, a configuration unit that is the basic of the conversation of "asking" and "a response". Specifically, the utterance pair indicates a pair of a preceding message and a response message.

The preceding message indicates an originated message that precedes. The response message indicates a message that configures a counterpart of the dialog with respect to the preceding message. The utterance pair is not limited to a form representing that the preceding message and the response message are of one-to-one relation, and it may be in one-to-many (multiple), many (multiple)-to-one, or many (multiple)-to-many (multiple) relation.

FIG. 3 is a schematic diagram illustrating an exemplary data configuration of the normal utterance pair information 20A. The normal utterance pair information 20A is information in which the intention of a preceding message and the intention of a response message configuring a normal utterance pair that does not cause confusion for users with respect to the preceding message are associated with each other. The data format of the normal utterance pair information 20A is not limited. For example, the normal utterance pair information 20A includes a database or a table.

The intention of a message indicates, concerning a message, the purpose and meaning of the origination (or utterance) of a user who originated the message. The intention of a message may include, in addition to the purpose and meaning of the origination of the message, a topic (keyword) that is included in the message.

Examples of the intention of a message include "question", "reply", "request", "rejection", "consent", and others. The intention of a message is not limited to the foregoing. For example, the intention of a message may be one indicating a keyword included in the message.

That is, the normal utterance pair information 20A is one in which pairs of intention of messages configuring a normal utterance pair are predefined. In the example illustrated in FIG. 3, illustrated are, as one example of pairs of the intention of a preceding message and the intention of a response message, the pairs of "question A" and "reply A", "question B" and "reply B", "request" and "consent", and "request" and "rejection".

For example, when the intention of an originated message that precedes is "question A" and the intention of a subsequently originated message is "reply A", the controller 18 described later distinguishes these messages as ones that configure a normal utterance pair.

The pairs of intention of the messages configuring a normal utterance pair registered in the normal utterance pair information 20A are not limited to those illustrated in FIG. 3. The normal utterance pair information 20A may be allowed to be added or modified according to an operating instruction and other actions from a user, as appropriate. As more detailed intention is registered in advance as a pair of intention that is registered in the normal utterance pair information 20A, smoother communication support can be achieved by the processing performed by the controller 18 described later.

Referring back to FIG. 2, the following describes the abnormal utterance pair information 20B. The abnormal utterance pair information 20B is information indicative of an abnormal utterance pair. According to the present embodiment, "abnormal" indicates that it has a possibility of causing confusion for the user. Technically, "abnormal" is referred to as "marked".

FIG. 4 is a schematic diagram illustrating an exemplary data configuration of the abnormal utterance pair information 20B. The abnormal utterance pair information 20B is information in which the intention of a preceding message and the intention of a response message configuring an abnormal utterance pair that has a possibility of causing confusion for users with respect to the preceding message are associated with each other. The data format of the abnormal utterance pair information 20B is not limited. For example, the abnormal utterance pair information 20B includes a database or a table.

That is, the abnormal utterance pair information 20B is one in which pairs of intention of the messages configuring an abnormal utterance pair are predefined. In the example illustrated in FIG. 4, illustrated are, as one example of pairs of the intention of a preceding message and the intention of a response message, the pairs of "question" and "question", "question" and "request", and "consent" and "rejection".

For example, when the intention of an originated message that precedes is "question" and the intention of a subsequent originated message is "question", the controller 18 described later distinguishes these messages as ones that configure an abnormal utterance pair.

The pairs of intention of the messages configuring an abnormal utterance pair registered in the abnormal utterance pair information 20B are not limited to those illustrated in FIG. 4. The abnormal utterance pair information 20B may be allowed to be added or modified according to an operating instruction and other actions from a user, as appropriate.

Next, referring back to FIG. 2, the following describes the history information 20C. The history information 20C is information indicative of execution history of reception and delivery processing in which the controller 18 of the support device 12 performs receiving of and delivery of messages with each of the terminal devices 14.

FIG. 5 is a schematic diagram illustrating an exemplary data configuration of the history information 20C. The history information 20C is sequentially updated in time series by the reception and delivery processing performed by the controller 18. That is, the controller 18 updates the history information 20C by performing recording to the history information 20C each time a message is acquired from the terminal device 14 and each time the controller 18 performs various processing described later. According to the present embodiment, the controller 18 updates the history information 20C by adding and registering the execution history to the history information 20C illustrated in FIG. 5 by one line at a time.

The history information 20C is information in which user identification information (hereinafter referred to as a user ID), message identification information (hereinafter referred to as a message ID), an acquisition time, intention, a distinction result, an utterance pair history, a delivery status, and a delivery mode are associated with one another. The data format of the history information 20C is not limited. The history information 20C may be in a text format or may be in a database or a table format, for example.

In the history information 20C, "message" is a message received from the terminal device 14. In the history information 20C, "message ID" is identification information that identifies a corresponding message. In the history information 20C, "user ID" is identification information of a user of originating the corresponding message. In other words, "user ID" in the history information 20C is the identification information of a user who operates the terminal device 14 originating the corresponding message. In the history information 20C, "user ID" may be the identification information of the terminal device 14 originating the corresponding message.

In the history information 20C, "acquisition time" indicates the timing at which the corresponding message is acquired (that is, received) from the terminal device 14. The acquisition time is expressed by month, date, hour, minute, and second, for example. The acquisition time only needs to be the information indicative of the timing at which the corresponding message was acquired from the terminal device 14, and is not limited to the form expressed by the month, date, hour, minute, and second. For example, the acquisition time may be expressed by the elapsed time that is the time elapsed after the power supply to the support device 12 is started (that is, after the power is turned on). In the history information 20C, "intention" indicates the intention of the corresponding message.

In the history information 20C, "distinction result" indicates a distinction result of whether the corresponding message has a possibility of causing confusion for users. Whether it has a possibility of causing confusion for users is distinguished by the controller 18 (detail will be described later). In the example illustrated in FIG. 5, the distinction result of "OK" indicates that it does not cause confusion for users (that is, it is normal). The distinction result of "NG" indicates that it has a possibility of causing confusion for users (that is, it is abnormal).

In the history information 20C, "utterance pair history" indicates the history of configuration status of a normal utterance pair of the messages received by the support device 12. According to the present embodiment, in "utterance pair history" in the history information 20C, the information that indicates whether it is not configuring a normal utterance pair and whether it has configured a normal utterance pair, on each of the messages originated from the respective terminal devices 14 is registered.

The phrase that it has configured a normal utterance pair indicates that an association of a normal utterance pair has been completed. The phrase that it is not configuring a normal utterance pair indicates that an association of a normal utterance pair has not been completed.

In FIG. 5, in "utterance pair history", the [m1/] indicates that the message identified by the message ID "m1" is not configuring a normal utterance pair. In FIG. 5, the [m1/m2] indicates that the message identified by the message ID "m1" and the message identified by the message ID "m2" are configuring a normal utterance pair.

That is, in the example illustrated in FIG. 5, one that is blank after the slash "/" indicates that it is not configuring a normal utterance pair. The one that message IDs are recorded before and after a slash "/" indicates that it is configuring a normal utterance pair.

In the history information 20C, "delivery status" indicates the delivery status of the corresponding message delivered to the terminal device 14. According to the present embodiment, the delivery status "delivered" indicates that the delivery has already been made. The delivery status "pending" indicates that the delivery is pending.

In the history information 20C, "delivery mode" indicates the delivery mode of the corresponding message delivered to the terminal device 14.

According to the present embodiment, a reference delivery mode and a changed delivery mode are used as the delivery mode. The reference delivery mode is a predefined delivery mode to be the reference.

According to the present embodiment, the reference delivery mode indicates that a message acquired from one terminal device 14 is immediately delivered to each of the other terminal devices 14. For example, suppose that the support device 12 acquired a message "Isn't there a red block?" identified by the message ID "m1" from the terminal device 14A. Then, the controller 18 of the support device 12 described later, in accordance with the reference delivery mode, immediately delivers the message "Isn't there a red block?" to each of the other terminal devices 14 (the terminal devices 14B to 14F).

The changed delivery mode is a delivery mode in which the reference delivery mode is changed by the processing of the controller 18 described later. The changing of the reference delivery mode and the changed delivery mode will be described later in detail.

Referring back to FIG. 2, the description is continued. The controller 18 of the support device 12 controls the support device 12. According to the present embodiment, the controller 18 executes the reception and delivery processing in which receiving of and delivery of messages with each of the terminal devices 14 are performed.

The controller 18 includes an acquirer 18A, an analyzer 18B, a determiner 18C, a changer 18D, and a deliverer 18E. Some or all of the acquirer 18A, the analyzer 18B, the determiner 18C, the changer 18D, and the deliverer 18E may be implemented by causing a processor such as a central processing unit (CPU) to execute a computer program, that is, implemented as software, or may be implemented as hardware such as an integrated circuit (IC), or as a combination of the software and the hardware.

The functions of the controller 18 may be implemented by using a virtual machine built on a cloud environment or may be implemented by using dedicated hardware.

The acquirer 18A acquires a message from the terminal device 14. In more detail, the acquirer 18A acquires the message that the communication I/F 22 received from the terminal device 14. In other words, the acquirer 18A acquires a message from each of the terminal devices 14 via the communication I/F 22 and the network 16. That is, the acquirer 18A acquires a message that was originated by the utterance and others of a user from the terminal device 14.

At this time, the acquirer 18A acquires, from the terminal device 14, the message and a user ID of the user operating the terminal device 14 originating the message. The acquirer 18A may acquire, in place of the user ID or together with the user ID, a terminal ID of the terminal device 14 originating the message.

The acquirer 18A assigns the acquired message to a message ID. The acquirer 18A then stores in the history information 20C the message ID, the acquired message, the user ID of the user of originating the message, and the acquisition time of the message, in a manner associated with one another (see FIG. 5).

The analyzer 18B analyzes the intention of a message acquired by the acquirer 18A each time the acquirer 18A acquires the message. That is, the analyzer 18B acquires the intention (for example, "question", "reply", and others) of the message, by analyzing the message acquired by the acquirer 18A.

For example, the analyzer 18B, by using a known data analysis method, extracts a keyword contained in the message and analyzes the intonation of the message. The analyzer 18B then stores in advance the keyword and the intonation of the message in a manner associated with the intention. The analyzer 18B only needs to analyze the intention by reading out the intention corresponding to the keyword extracted from the message, and the analyzed intonation of the message.

A message may be analyzed by the analyzer 18B using a known analysis technique. Examples of a known analysis technology include voice analysis processing and collation processing. Examples of voice analysis processing include voice section detection, power analysis, fast Fourier transform (FFT), and spectral analysis. The collation processing is performed with a voice recognition vocabulary dictionary including an acoustic model, a language model, and other models. The collation processing uses, for example, a hidden Markov model (HMM), a neutral network (NN), a dynamic programming (DP), a weighted finite state transducer (WFST), or other technologies.

In addition, examples of a known analysis technology include voice signal detection, voice analysis, voice parsing, voice classification, prosody analysis, and voice recognition technologies. The analyzer 18B may perform the analysis with the known analysis technologies singly or in combination.

The determiner 18C distinguishes whether the message acquired by the acquirer 18A has a possibility of causing confusion for users.

According to the present embodiment, the determiner 18C distinguishes, based on the intention of the message acquired by the acquirer 18A, whether the message has a possibility of causing confusion for users. The determiner 18C may distinguish by using other methods. For example, when a message acquired by the acquirer 18A contains a predefined keyword, the determiner 18C distinguishes the message as one that has a possibility of causing confusion for users.

According to the present embodiment, when a message acquired by the acquirer 18A does not configure a normal utterance pair with a message that is not configuring a normal utterance pair out of the acquired messages that were acquired before the message, the determiner 18C distinguishes the message as one that has a possibility of causing confusion for users.

For example, suppose that, in the history information 20C illustrated in FIG. 5, the messages identified by the respective message IDs of "m1" to "m3" have been acquired and the acquirer 18A newly acquired a message "Doesn't anyone have a short green one?" identified by the message ID "m4". At this time, as indicated in the utterance pair history, out of the acquired messages, the message "Where is a long blue block?" identified by the message ID "m3" is not configuring a normal utterance pair.

In this case, the determiner 18C distinguishes whether this message "Where is a long blue block?" of not configuring a normal utterance pair and the newly acquired message (the message "Doesn't anyone have a short green one?" identified by the message ID "m4") configure a normal utterance pair.

In more detail, the determiner 18C distinguishes whether the intention "question" of this message (the message "Where is a long blue block?" identified by the message ID "m3") of not configuring a normal utterance pair and the intention "question" of the newly acquired message (the message "Doesn't anyone have a short green one?" identified by the message ID "m4") are registered in the normal utterance pair information 20A (see FIG. 3) in a manner associated with each other. Then, when the intention of these messages is registered in the normal utterance pair information 20A in a manner associated with each other, the determiner 18C distinguishes these messages as ones that configure a normal utterance pair.

When the intention of these messages is not registered in the normal utterance pair information 20A in a manner associated with each other, the determiner 18C distinguishes these messages as ones that do not satisfy a normal utterance pair.

When the messages are distinguished as ones that do not satisfy a normal utterance pair, the determiner 18C distinguishes this newly acquired message as one that has a possibility of causing confusion for users. That is, a pair of "question" and "question" that is the pair of the intention of a preceding message and the intention of a response message, which is not registered in the normal utterance pair information 20A, has a possibility of causing confusion for users, for example.

Specifically, it is assumed that the controller 18 consecutively acquired a message of the intention "question" and another message of the intention "question". In this case, it is difficult to understand for which of the acquired messages of the intention "question" a subsequently acquired message of the intention "reply" is the message that indicates "reply". In such a case, it has a possibility of causing confusion for users. Consequently, in such a case, the determiner 18C distinguishes the message as one that has a possibility of causing confusion for users.

According to the present embodiment, when the acquired message not configuring a normal utterance pair and a newly acquired message do not configure a normal utterance pair and when they configure an abnormal utterance pair, the determiner 18C distinguishes the newly acquired message as one that has a possibility of causing confusion for users.

That is, the determiner 18C further distinguishes whether the intention of the message not configuring a normal utterance pair and the intention of the newly acquired message are registered in the abnormal utterance pair information 20B (see FIG. 4) in a manner associated with each other. Then, when the intention of these messages is registered in the abnormal utterance pair information 20B in a manner associated with each other, the determiner 18C distinguishes these messages as ones that configure an abnormal utterance pair.

The determiner 18C then distinguishes the newly acquired message, which was distinguished as one that does not configure a normal utterance pair and configures an abnormal utterance pair, as one that has a possibility of causing confusion for users.

The changer 18D changes, on the message that was distinguished as one that has a possibility of causing confusion for users, the delivery mode of the message to a delivery mode that eliminates the confusion.

Specifically, the changer 18D changes the reference delivery mode. As described in the foregoing, the reference delivery mode indicates that a message acquired from one terminal device 14 is immediately delivered to each of the other terminal devices 14.

The changer 18D changes at least one of delivery timing of and delivery method of the message which are indicated by the reference delivery mode. The delivery timing indicated by the reference delivery mode is "immediate". In more detail, it indicates delivering a message instantly (immediately) upon receiving the message from the terminal device 14. The delivery method indicated by the reference delivery mode indicates delivering the message as is to each of the terminal devices 14, other than the terminal device 14 originating the message.

When a message acquired by the acquirer 18A has a possibility of causing confusion for users, the changer 18D changes, on the message, the delivery mode so as to deliver the message after keeping the delivery of the message on hold for a predetermined certain time, for example. The predetermined certain time only needs to be determined in advance.

When a message acquired by the acquirer 18A has a possibility of causing confusion for users, the changer 18D may change, on the message, the delivery mode so as to deliver the message after keeping the delivery of the message on hold until the acquirer 18A acquires another new message that configures a normal utterance pair with the message.

For example, suppose that the determiner 18C distinguished the message "Doesn't anyone have a short green one?" identified by the message ID "m4" in the history information 20C illustrated in FIG. 5, as one that has a possibility of causing confusion for users. In this case, the changer 18D changes the delivery mode so as to keep the delivery of the message identified by the message ID "m4" on hold until the acquirer 18A acquires another new message that configures a normal utterance pair with the message.

Thus, the message "Doesn't anyone have a short green one?" identified by the message ID "m4" is delivered to each of the terminal devices 14 before the delivery of the new message identified by the message ID "m6" that configures a normal utterance pair with the message, for example. Then, subsequent to the message identified by the message ID "m4", the message identified by the message ID "m6" is to be delivered.

When a message acquired by the acquirer 18A has a possibility of causing confusion for users and, on the message, the delivery of the message is kept on hold for a predetermined time (that is, temporary holding), it is preferable that the changer 18D control the deliverer 18E so as to perform specific delivery processing.

In more detail, in this case, it is preferable that the changer 18D control the deliverer 18E described later so as to deliver information indicative of temporary holding of the message to the user of originating the message. Specifically, it is preferable that the changer 18D control the deliverer 18E so as to deliver the information indicative of temporary holding of the message to the terminal device 14 of the user identified by the user ID of the user of originating the message.

Thus, for the user (the terminal device 14) of originating the message which is kept on hold temporarily by the support device 12, it can be presented that the message is in a state of being temporarily on hold.

Furthermore, when delivering the message that has been kept on hold temporarily (that is, on hold for a certain time), it is preferable that the changer 18D control the deliverer 18E described later so as to deliver information indicative of the cancellation of keeping the message on hold to the user of originating the message. Specifically, it is preferable that the changer 18D control the deliverer 18E so as to deliver the information indicative of deferred delivery of the message to the terminal device 14 of the user identified by the user ID of the user of originating the message.

The changer 18D may change, on the message that has a possibility of causing confusion for users, the delivery mode by changing the delivery method of the message. For example, the changer 18D may change the delivery mode so as to deliver, out of the acquired messages that were acquired before the message that has a possibility of causing confusion for users, the identification information on a message that configures a normal utterance pair with the message that has a possibility of causing confusion for users, together with the message that has a possibility of causing confusion for users.

In this case, as the identification information on a message that configures a normal utterance pair with the message that is distinguished as one that has a possibility of causing confusion for users, it is preferable to use the content of the message identified by the identification information and to use the information indicative of configuring the normal utterance pair with the message, for example. For the information indicative of configuring the normal utterance pair, it only needs to use the intention of the message. Specifically, it is preferable that the changer 18D change the delivery mode so as to deliver such information as "this message is a reply to the message "Doesn't anyone have a short green one?"".

The deliverer 18E delivers the message acquired by the acquirer 18A to the terminal devices 14 in the delivery mode that has been changed by the changer 18D. In more detail, as for a message for which the delivery mode was not changed by the changer 18D, the deliverer 18E delivers the message in the reference delivery mode. That is, the deliverer 18E delivers the message acquired by the acquirer 18A immediately to each of a plurality of terminal devices 14 included in the communication support system 10.

It is preferable that the deliverer 18E delivers the message to the terminal devices 14 other than the terminal device 14 of the user of originating the message. The deliverer 18E may deliver the message to both the terminal device 14 of the user of originating the message and each of the terminal devices 14 other than the terminal device 14.

Meanwhile, as for a message for which the delivery mode was changed by the changer 18D, the deliverer 18E delivers the message to the terminal devices 14 in the delivery mode after the change (that is, a changed delivery mode). In more detail, the deliverer 18E delivers the message distinguished as one that has a possibility of causing confusion for users in the delivery timing and the delivery method indicated in the changed delivery mode.

Thus, the deliverer 18E delivers the message distinguished as one that has a possibility of causing confusion for users, after keeping the delivery of the message on hold for a predefined certain time, for example.

The deliverer 18E can also deliver the message distinguished as one that has a possibility of causing confusion for users, after keeping the delivery of the message on hold until the acquirer 18A acquires another new message that configures a normal utterance pair with the message, for example.

The deliverer 18E can also deliver, for the message distinguished as one that has a possibility of causing confusion for users, the information indicative of temporary holding of the message to the terminal device 14 of the user identified by the user ID of the user of originating the message.

When delivering the message that has been kept on hold temporarily (that is, on hold for a certain time), the deliverer 18E can also deliver the information indicative of the cancellation of keeping the message on hold to the user of originating the message.

The deliverer 18E can deliver the message distinguished as one that has a possibility of causing confusion for users to the terminal devices 14 and can also deliver the identification information on the message that configures a normal utterance pair such as "this message is a reply to the message "Doesn't anyone have a short green one?"" to the terminal devices 14.

Next, the following describes the terminal device 14.

As illustrated in FIG. 2, the terminal device 14 includes a communication I/F 24, a controller 26, an output device 28, an operation device 30, an input device 32, and a storage device 34. The communication I/F 24, the output device 28, the operation device 30, the input device 32, and the storage device 34 are connected to the controller 26 in such a manner that signals can be exchanged.

The communication I/F 24 communicates with the support device 12, another terminal device 14, an external device, and other devices over the network 16 in a wireless or wired manner.

The output device 28 outputs various information. According to the present embodiment, the output device 28 outputs a message. The output device 28 is a speaker for outputting voice or a display unit for displaying an image, for example. The output device 28 may include both the function of outputting voice and the function of displaying an image.

According to the present embodiment, the output device 28 outputs a message delivered from the support device 12. Specifically, the output device 28 outputs voice indicative of the message delivered from the support device 12 or outputs an image indicative of the message.

The operation device 30 is operated by a user and receives various instructions from the user. Examples of the operation device 30 include a keyboard and a touch panel.

The input device 32 receives a message input from a user. When the message is voice data, the input device 32 is a microphone. In this case, specifically, the input device 32 includes a microphone, an amplifier (signal amplifier), analog/digital (A/D) converter, a memory, or other components. The input device 32 converts a waveform of voice uttered by the user to voice data, and outputs the voice data to the controller 26. When a message is video data, the input device 32 is an imaging apparatus capable of imaging a video.

The operation device 30 may receive the input of a message from a user. For example, the operation of the operation device 30 by the user may be converted into voice data or text data by the controller 26 and may be transmitted to the support device 12 as a message.

The output device 28 and the input device 32 may be in a form attachable to the head or other parts of a user. Accordingly, the user can, by uttering toward the microphone as the input device 32, originate a message in a hands-free manner, for example. The user can, by listening to a message as the voice from the speaker as the output device 28 that is attached to the head or other parts, check the delivered message in a hands-free manner.

The storage device 34 stores therein various data.

The controller 26 controls the entire terminal device 14. For example, the controller 26 receives a message from the support device 12 via the communication I/F 24 and the network 16. The controller 26 then outputs the received message from the output device 28. Thus, the message delivered from the support device 12 is output by the terminal device 14.

Furthermore, when a message (voice data or video data) is input from the operation device 30 or the input device 32, the controller 26 transmits to the support device 12, via the communication I/F 24 and the network 16, the input message and the user ID of a user operating the terminal device 14. Accordingly, the user carrying the terminal device 14 can originate a message to the users of the other terminal devices 14.

The controller 26 preliminarily stores the user ID of a user who operates the terminal device 14 in the storage device 34. The controller 26 may then transmits, as the user ID of the input message, the user ID stored in the storage device 34 to the support device 12. The input device 32 may be provided with a user identification function. In this case, the controller 26 may acquire a message and the user ID of a user of originating the message from the input device 32, and transmit the acquired message and user ID to the support device 12. The controller 26 may use, as the user ID of a user of originating the message, the user ID input by an operation of the operation device 30 at the time of inputting of a message by the user.

Figure 6:
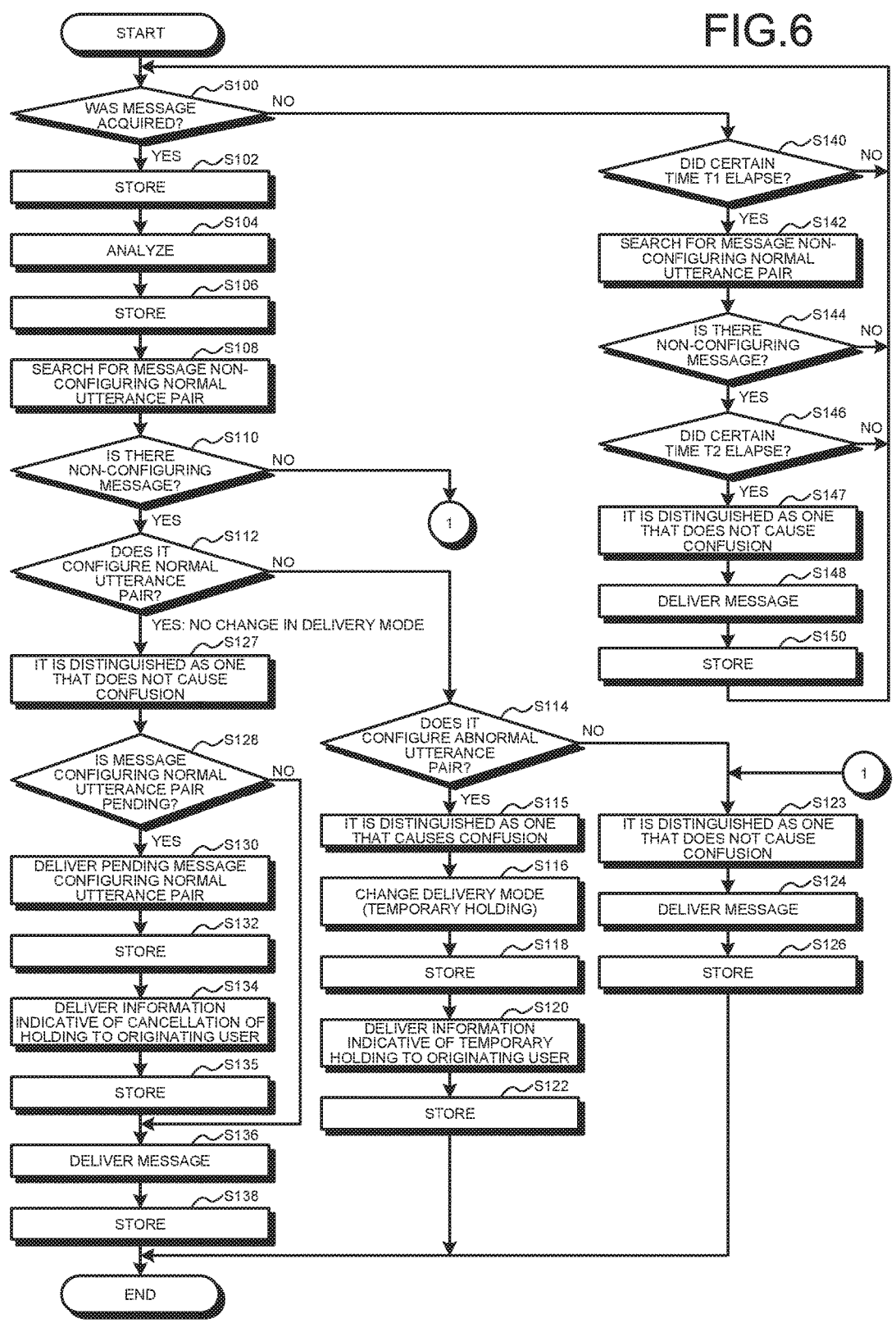
FIG. 6 is a flowchart illustrating an exemplary procedure of reception and delivery processing.

Next, the following describes a procedure of reception and delivery processing performed by the controller 18 in the support device 12. FIG. 6 is a flowchart illustrating an exemplary procedure of reception and delivery processing performed by the controller 18. The support device 12 repeatedly performs the reception and delivery processing illustrated in FIG. 6.

First, the acquirer 18A determines whether a message has been acquired from any terminal device 14 (Step S100). According to the present embodiment, the acquirer 18A determines whether a message and a user ID have been acquired from any terminal device 14.

If the acquirer 18A determines Yes at Step S100 (Yes at Step S100), the processing proceeds to Step S102. At Step S102, the acquirer 18A assigns the acquired message to a message ID. The acquirer 18A then stores the message ID, the acquired message, the user ID of the user of originating the message, and the acquisition time of the message in the history information 20C (see FIG. 5) in a manner associated with one another (Step S102).

Next, the analyzer 18B analyzes the intention of the message acquired at Step S100 (Step S104). The analyzer 18B then stores the analyzed intention into the history information 20C (see FIG. 5) in a manner associated with the message acquired at Step S100 (Step S106).

Next, the determiner 18C searches for, out of the acquired messages acquired before the message acquired at Step S100, a message that is not configuring a normal utterance pair (Step S108). The determiner 18C then distinguishes whether there is a message that is not configuring a normal utterance pair by the search at Step S108 (Step S110).

If the determiner 18C determines No at Step S110 (No at Step S110), the processing proceeds to Step S123 described later. If the determiner 18C determines Yes at Step S110 (Yes at Step S110), the processing proceeds to Step S112.

At Step S112, on the message that is determined to be Yes at Step S110 and that is not configuring a normal utterance pair out of the acquired messages, the determiner 18C distinguishes whether it configures a normal utterance pair with the message acquired at Step S100 (Step S112).

At Step S112, the determiner 18C determines whether the intention of the message acquired at Step S100 and the intention of the message of not configuring a normal utterance pair out of the acquired messages are registered in the normal utterance pair information 20A (see FIG. 3) in a manner associated with each other. In this manner, the determiner 18C performs the determination of Step S112.

If the determiner 18C determines that the message does not configure a normal utterance pair (No at Step S112), the processing proceeds to Step S114.

At Step S114, the determiner 18C determines whether the intention of the message acquired at Step S100 and the intention of the message not configuring a normal utterance pair out of the acquired messages configure an abnormal utterance pair (Step S114). At Step S114, the determiner 18C determines whether the intention of the message acquired at Step S100 and the intention of the message not configuring a normal utterance pair out of the acquired messages are registered in the abnormal utterance pair information 20B (see FIG. 4) in a manner associated with each other. In this manner, the determiner 18C performs the determination of Step S114.

If the message is determined to configure an abnormal utterance pair (Yes at Step S114), the determiner 18C distinguishes the message acquired at Step S100 as one that has a possibility of causing confusion for users (Step S115). The determiner 18C then registers "NG" that indicates the distinction result "abnormal" into the history information 20C (see FIG. 5) in a manner associated with the message acquired at Step S100.

Next, the changer 18D changes, on the message acquired at Step S100, the delivery mode of the message (Step S116). In the procedure illustrated in FIG. 6, described is a situation in which the changer 18D changes the delivery mode so as to deliver the message after the delivery of the message is kept on hold temporarily until the acquirer 18A newly acquires another new message that configures a normal utterance pair with the message, as one example.

The changer 18D then stores the changed delivery mode that is the delivery mode that has been changed into the history information 20C (see FIG. 5) in a manner associated with the message acquired at Step S100 (Step S118).

For example, it is assumed that the message acquired at Step S100 was the message "Doesn't anyone have a short green one?" identified by the message ID "m4" in the history information 20C illustrated in FIG. 5. Then, it is assumed that this message was distinguished as one that has a possibility of causing confusion for users at Step S115. In this case, the changer 18D registers, as the delivery mode, the information indicative of temporarily holding the message (for example, "temporary holding (m4)") into the history information 20C in a manner associated with the message identified by the message ID "m4".

Furthermore, at Step S118, the changer 18D copies the utterance pair history corresponding to the message that was acquired immediately before the message acquired at Step S100 in the history information 20C, and registers it into the utterance pair history of the history information 20C in a manner associated with the message acquired at Step S100. The changer 18D then registers, in the utterance pair history, the information indicating that the message acquired at Step S100 is a message not configuring a normal utterance pair.

Specifically, when the message acquired at Step S100 is the message identified by the message ID "m4", the changer 18D adds and registers the information indicating [m4/] so as to be indicative of being not configuring a normal utterance pair, to the utterance pair history corresponding to the message ID.

Next, the changer 18D controls the deliverer 18E so as to deliver the information indicative of temporary holding of the message to the terminal device 14 of the user identified by the user ID of the user of originating the message acquired at Step S100. Thus, the deliverer 18E delivers the information indicative of temporary holding of the message to the terminal device 14 of the user identified by the user ID of the user of originating the message acquired at Step S100 (Step S120). For example, the deliverer 18E delivers, to the terminal device 14 of the user of the user ID corresponding to the message ID "m4", the information stating that "the message "Doesn't anyone have a short green one?" is temporarily kept on hold".

Thus, it can be presented easily, to the user of originating the message acquired at Step S100, that the message originated by the user by using the terminal device 14 is kept on hold temporarily.

The changer 18D then assigns, to the information delivered at Step S120, identification information (for example, "s1") indicating that the information was generated on the support device 12 side, as a message ID. The changer 18D then registers the assigned message ID, the information delivered at Step S120, and the information indicative of having delivered to the terminal device 14 of the user of the user ID corresponding to the message ID "m4", into the history information 20C (see FIG. 5), in a manner associated with one another (Step S122). This routine is then ended.

If the determiner 18C determines No at Step S114 (No at Step S114), the processing proceeds to Step S123. At Step S123, the determiner 18C distinguishes the message acquired at Step S100 as one that does not cause confusion for users (Step S123). The determiner 18C then registers "OK" that indicates the distinction result "normal" into the history information 20C (see FIG. 5) in a manner associated with the message acquired at Step S100.

Next, on the message acquired at Step S100, the deliverer 18E delivers it in the reference delivery mode, without changing the delivery mode of the message (Step S124). Thus, the message acquired at Step S100 can be immediately delivered to the terminal devices 14 of the users other than the user of originating the message. At Step S124, the message acquired at Step S100 may also be delivered to the terminal device 14 of the user of originating the message.

The deliverer 18E then stores the reference delivery mode into the history information 20C (see FIG. 5) in a manner associated with the message acquired at Step S100 (Step S126).

For example, it is assumed that the message acquired at Step S100 was the message "Where is a long blue block?" identified by the message ID "m3" in the history information 20C illustrated in FIG. 5. Then, it is assumed that this message was distinguished as one that does not cause confusion for users at Step S123. In this case, the deliverer 18E registers, as the delivery mode, the information indicating that the message was immediately delivered to the terminal devices 14 of the users other than the user of originating the message (for example, "immediate delivery (m3)>others") into the history information 20C in a manner associated with the message identified by the message ID "m3".

Furthermore, at Step S126, the deliverer 18E copies the utterance pair history corresponding to the message that was acquired immediately before the message acquired at Step S100 in the history information 20C, and registers it into the utterance pair history of the history information 20C in a manner associated with the message acquired at Step S100. The deliverer 18E then registers, in the utterance pair history, the information indicating that the message acquired at Step S100 is a message not configuring a normal utterance pair.

Specifically, when the message acquired at Step S100 is the message identified by the message ID "m3", the deliverer 18E adds and registers the information indicating [m3/] so as to be indicative of being not configuring a normal utterance pair, to the utterance pair history corresponding to the message ID. This routine is then ended.

In the determination described at Step S112, on the message that is not configuring a normal utterance pair out of the acquired messages, if the determiner 18C determines that it configures a normal utterance pair with the message acquired at Step S100 (Yes at Step S112), the processing proceeds to Step S127.

At Step S127, the determiner 18C distinguishes the message acquired at Step S100 as one that does not cause confusion for users (Step S127). The determiner 18C then registers "OK" that indicates the distinction result "normal" into the history information 20C (see FIG. 5) in a manner associated with the message acquired at Step S100.

Next, on the acquired message that was distinguished at Step S112 as one that configures a normal utterance pair with the message acquired at Step S100, the determiner 18C distinguishes whether the delivery to the terminal devices 14 is pending (Step S128).

At Step S128, by determining whether the delivery status corresponding to the acquired message that was distinguished at Step S112 in the history information 20C (see FIG. 5) is "pending", the distinction at Step S128 is performed.

If the determiner 18C determines that the delivery is not pending (No at Step S128), the processing proceeds to Step S136 described later. If the determiner 18C determines that the delivery is pending (Yes at Step S128), the processing proceeds to Step S130.

At Step S130, the deliverer 18E delivers the message that is the acquired message configuring a normal utterance pair with the message acquired at Step S100 and for which the delivery to the terminal devices 14 is pending (Step S130).

Thus, the deliverer 18E can deliver the message distinguished as one that has a possibility of causing confusion for users, after keeping the delivery of the message on hold until the acquirer 18A acquires another new message that configures a normal utterance pair with the message.

Next, the deliverer 18E registers, in the history information 20C, the information indicating that the message was delivered after having been kept on hold temporarily (for example, "deferred delivery (m4)>others"), as the delivery mode, in a manner associated with the message delivered at Step S130 (see FIG. 5) (Step S132).

Furthermore, at Step S132, the deliverer 18E copies the utterance pair history corresponding to the message that was delivered immediately before the message delivered at Step S130 in the history information 20C, and registers it into the utterance pair history of the history information 20C in a manner associated with the message delivered at Step S130.

At Step S132, the deliverer 18E further registers the information indicative of having been delivered in the delivery status corresponding to the message ID of the message delivered at Step S130.

Next, the deliverer 18E delivers the information indicating that the temporary holding of the message was canceled to the terminal device 14 of the user identified by the user ID of the user of originating the message that had been pending and was delivered at Step S130 (Step S134).

The deliverer 18E then assigns, to the information delivered at Step S134, the identification information (for example, "s2") indicating that the information was generated on the support device 12 side, as a message ID. The changer 18D then registers, in a manner associated with one another, the assigned message ID, the information delivered at Step S134, and the information indicative of having delivered to the terminal device 14 of the user of the user ID corresponding to the message ID (for example, "m4") that had been pending, into the history information 20C (see FIG. 5) (Step S135).

Next, on the message acquired at Step S100, the deliverer 18E delivers it in the reference delivery mode, without changing the delivery mode of the message (Step S136).

Thus, the message acquired at Step S100 can be immediately delivered to the terminal devices 14 of the users other than the user of originating the message after having delivered the message that configures a normal utterance pair with the message and has been pending. At Step S136, the message acquired at Step S100 may also be delivered to the terminal device 14 of the user of originating the message.

The deliverer 18E then stores the reference delivery mode into the history information 20C (see FIG. 5) in a manner associated with the message acquired at Step S100 (Step S138).

For example, it is assumed that the message acquired at Step S100 was the message "It's in the room B" identified by the message ID "m6" in the history information 20C illustrated in FIG. 5. Then, it is assumed that this message was distinguished as one that does not cause confusion for users at Step S127. In this case, the deliverer 18E registers, as the delivery mode, the information indicating that the message was immediately delivered to the terminal devices 14 of the users other than the user of originating the message (for example, "immediate delivery (m6)>others") into the history information 20C in a manner associated with the message identified by the message ID "m6".

At Step S138, the deliverer 18E copies the utterance pair history corresponding to the message that was delivered immediately before the message acquired at Step S100 in the history information 20C, and registers it into the utterance pair history of the history information 20C in a manner associated with the message acquired at Step S100. The deliverer 18E then registers, in the utterance pair history, the information indicative of being a message that configures a normal utterance pair with the message the holding of which was canceled and that was delivered, at Step S134.

Specifically, it is assumed that the message acquired at Step S100 was the message identified by the message ID "m6" and the message the holding of which was canceled and that was delivered at Step S134 was the message identified by the message ID "m4". In this case, the deliverer 18E adds and registers the information indicating [m4/m6] so as to be indicative of having configured a normal utterance pair, to the utterance pair history corresponding to the message ID "m6" (see FIG. 5). This routine is then ended.

If the acquirer 18A determines No at the above-described Step S100 (No at Step S100), the processing proceeds to Step S140. At Step S140, the acquirer 18A determines whether a certain time T1 has elapsed since a message was acquired from any of the terminal devices 14 (Step S140). The certain time T1 only needs to be set to any desired value in advance.

If the acquirer 18A determines No at Step S140 (No at Step S140), the processing returns to the above-described Step S100. If the acquirer 18A determines Yes at Step S140 (Yes at Step S140), the processing proceeds to Step S142.

At Step S142, the determiner 18C searches for, on the acquired messages, a message that is not configuring a normal utterance pair (Step S142). At Step S142, the determiner 18C searches for the information indicative of a message not configuring a normal utterance pair that is included in the utterance pair history corresponding to the latest acquisition time in the history information 20C (see FIG. 5).

The determiner 18C then distinguishes whether there is a message that is not configuring a normal utterance pair by the search at Step S142 (Step S144). If the determiner 18C determines No at Step S144 (No at Step S144), the processing returns to the above-described Step S100. If the determiner 18C determines Yes at Step S144 (Yes at Step S144), the processing proceeds to Step S146.

At Step S146, the determiner 18C determines whether the holding time of the message not configuring a normal utterance pair that was determined at Step S144 has passed a predetermined certain time T2 (Step S146). If the determiner 18C determines No at Step S146 (No at Step S146), the processing returns to the above-described Step S100.

If the determiner 18C determines Yes at Step S146 (Yes at Step S146), the processing proceeds to Step S147. At Step S147, the determiner 18C distinguishes, out of the messages distinguished as ones that are not configuring a normal utterance pair at Step S144, the message the holding time of which has passed the certain time T2 at Step S146 as one that does not cause confusion for users (Step S147).

The determiner 18C then registers "OK" that indicates the distinction result "normal" into the history information 20C (see FIG. 5) in a manner associated with the message distinguished at Step S147.

Next, the deliverer 18E delivers the message distinguished at Step S147 (Step S148).

Next, the deliverer 18E registers, in the history information 20C, the information indicating that the message was delivered after having been kept on hold temporarily (for example, "deferred delivery (m4)>others"), as the delivery mode, in a manner associated with the message delivered at Step S148 (see FIG. 5) (Step S150). The processing then returns to the above-described Step S100. Note that, between Step S150 and Step S100, the same processing as that at the above-described Step S134 and Step S135 may further be performed.

As the support device 12 executes the reception and delivery processing illustrated in FIG. 6, the delivery of the messages is performed as illustrated in the history information 20C in FIG. 5. For example, the messages that users 1 to 3 originated in sequence and are identified by the message IDs "m1" to "m3", respectively, are distinguished as ones that do not cause confusion for users. Thus, each time these messages are acquired, the controller 18 delivers them to each of a plurality of terminal devices 14 immediately.

Then, the message originated by a user 4 and identified by the message ID "m4" is distinguished as one that has a possibility of causing confusion for users, and the delivery is kept on hold temporarily. Then, the information indicating that the message is kept on hold is delivered to the terminal device 14 of the user identified by the user 4.

Furthermore, on the message originated by a user 5 and identified by the message ID "m5", it is distinguished as one that does not cause confusion for users. Thus, the controller 18 delivers the message identified by the message ID "m5" to each of the terminal devices 14 immediately. Then, the controller 18 cancels the holding of the message that has been kept on hold temporarily and is identified by the message ID "m4", and delivers it to each of the terminal devices 14. The controller 18 further delivers the information indicative of the cancellation of the holding to the terminal device 14 of the user 4 of originating the message. The controller 18 then delivers the message identified by the message ID "m6" configuring a normal utterance pair with the message identified by the message ID "m4" to the terminal devices 14 immediately.

Thus, the support device 12 according to the present embodiment can deliver each of the messages to each of a plurality of terminal devices 14 in a delivery mode that eliminates confusion.

Figures 7, 8:
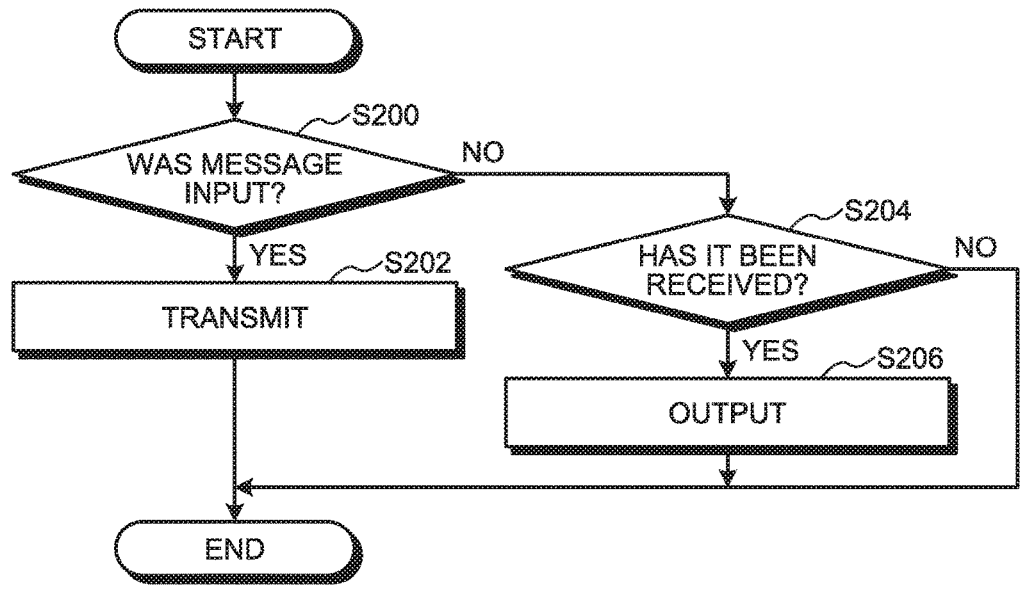
FIG. 7 is a flowchart illustrating an exemplary procedure of origination and reception processing.
FIG. 8 is a schematic diagram illustrating one example of conventional message delivery.

Next, the following describes an exemplary procedure of the origination and reception processing that the terminal device 14 performs. FIG. 7 is a flowchart illustrating an exemplary procedure of the origination and reception processing performed by the controller 26 of the terminal device 14. The controller 26 repeatedly performs the origination and reception processing illustrated in FIG. 7.

The controller 26 determines whether a message has been input from the input device 32 (Step S200). If the controller 26 determines Yes at Step S200 (Yes at Step S200), the processing proceeds to Step S202. At Step S202, the controller 26 transmits, to the support device 12, the message input at Step S200, and the user ID of the user operating the terminal device 14 (Step S202). This routine is then ended.

If the controller 26 determines No at the above-described Step S200 (No at Step S200), the processing proceeds to Step S204. At Step S204, the controller 26 determines whether a message or various information has been received from the support device 12 (Step S204). If the controller 26 determines No at Step S204 (No at Step S204), this routine is ended. If the controller 26 determines Yes at Step S204 (Yes at Step S204), the processing proceeds to Step S206. At Step S206, the controller 26 outputs the message or the information received at S204 from the output device 28 (Step S206). This routine is then ended.

As described above, the support device 12 according to the present embodiment is a communication support device that performs communication with a plurality of terminal devices 14. The support device 12 includes the acquirer 18A, the changer 18D, and the deliverer 18E. The acquirer 18A acquires messages from the terminal devices 14. When an acquired message has a possibility of causing confusion for users, the changer 18D changes, on the message, the delivery mode of the message to a delivery mode that eliminates the confusion. The deliverer 18E delivers the message to the terminal devices 14 in the delivery mode that has been changed.

Thus, with the support device 12 of the present embodiment, on the user side that the messages were delivered, a situation in which understanding the corresponding relation among the respective messages is difficult is suppressed.

In the conventional system, when a plurality of messages different from one another are originated in a mixed manner, on the user side that the messages were delivered, there has been a situation in which understanding the corresponding relation among the respective messages may be difficult.

FIG. 8 is a schematic diagram illustrating an example of message delivery using the conventional system. For example, suppose that messages different from one another were originated in sequence from each of a plurality of terminal devices 14 by the users operating the respective terminal devices 14. As illustrated in FIG. 8, for example, when messages identified by the message IDs "m1" to "m6" are originated in order of the foregoing, the messages were simultaneously delivered to the terminal devices 14 in order of the origination, in the conventional system.

For example, it is assumed that the message that is identified by the message ID "m3" and the message that is identified by the message ID "m4" have their intention "question". Then, it is assumed that, after having delivered the messages identified by the respective message IDs "m3" and "m4", the message intended for "reply" to "question" identified by the message ID "mb" was delivered.

In this case, it is unknown to which of the messages identified by the message IDs "m3" and "m4" intended for "question" the message identified by the message ID "mb" intended for "reply" corresponds.

Thus, in the conventional system, on the user side that the messages were delivered, there has been a situation in which understanding the corresponding relation among the respective messages may be difficult. Thus, in the conventional system, it has been difficult to support smooth communication.

Meanwhile, when the acquired message has a possibility of causing confusion for users, the support device 12 according to the present embodiment changes, on the message, the delivery mode of the message to a delivery mode that eliminates the confusion. Then, the support device 12 delivers the message to the terminal devices 14 in the delivery mode that has been changed.

Consequently, the support device 12 according to the present embodiment can support smooth communication.

First Modification

According to the above-described embodiment, described has been the embodiment in which the deliverer 18E delivers the message acquired by the acquirer 18A to the users other than the user of originating the message. However, the deliverer 18E may divide a plurality of terminal devices 14 belonging to the communication support system 10 into a plurality of predetermined groups, and may deliver the message at a different timing for the terminal devices 14 belonging to each group.

In this case, the changer 18D only needs to change the delivery mode so that the delivery of the message, which was distinguished by the determiner 18C as one that has a possibility of causing confusion, is kept on hold temporarily for the terminal devices 14 belonging to each group.

Second Modification

According to the above-described embodiment, described has been a situation in which the changer 18D changes the delivery mode, on a message that has a possibility of causing confusion for users, so that the message is delivered after having kept the message on hold.

However, the changer 18D may change the delivery method so as to deliver relevant information concerning an acquired message that is instructed by the operating instructions of the user operating the terminal device 14 and that configures a normal utterance pair with the message, together with the message that has a possibility of causing confusion for users.

Figure 9:
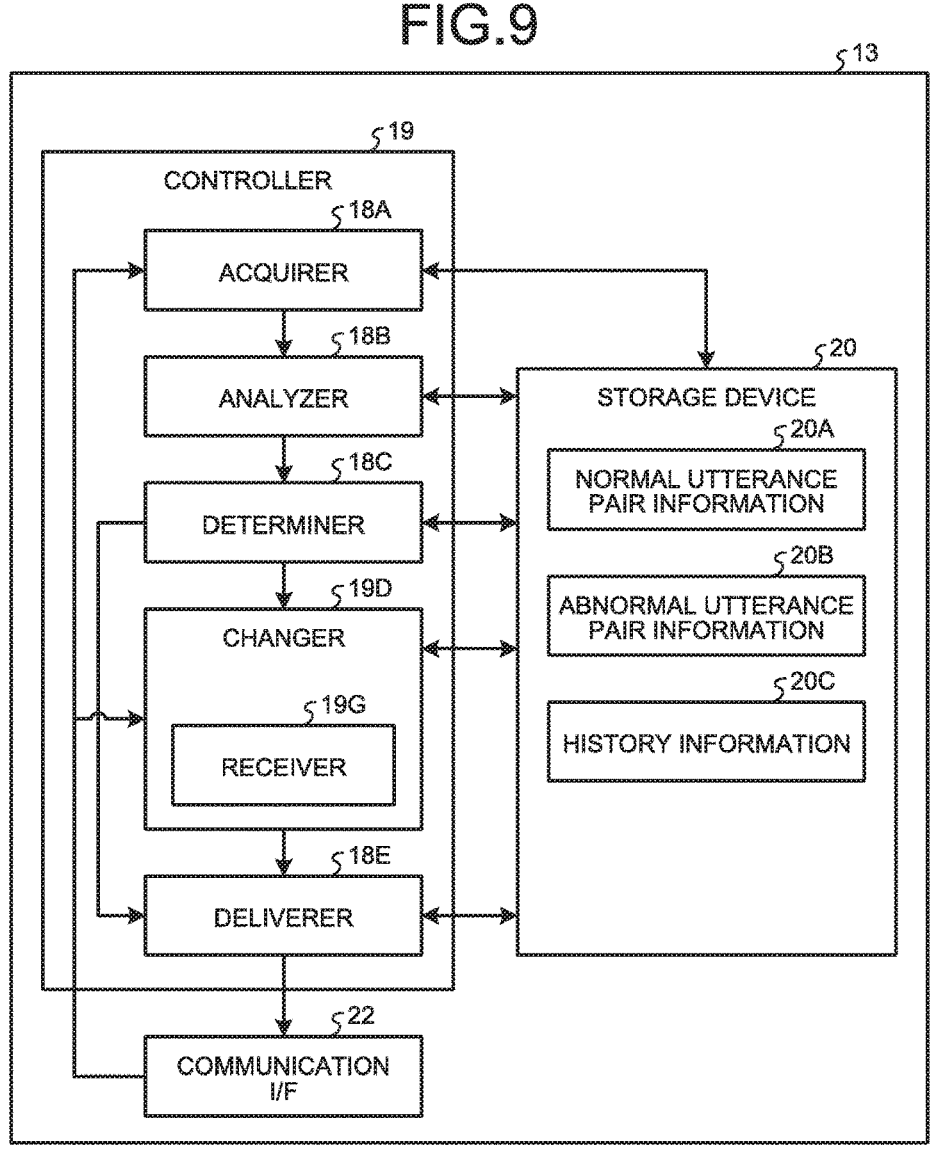
FIG. 9 is a functional block diagram illustrating a support device according to a modification.

In this case, it only needs to be a communication support system 10A that includes a support device 13 in place of the support device 12 (see FIG. 1). FIG. 9 is one example of a functional block diagram of the support device 13 according to a second modification.

The support device 13 includes a controller 19, the storage device 20, and the communication I/F 22. The storage device 20 and the communication I/F 22 are connected to the controller 19 in such a manner that data and signals can be exchanged. The storage device 20 and the communication I/F 22 are the same as those of the support device 12 according to the above-described embodiment (see FIG. 2).

The controller 19 controls the support device 13. The controller 19 includes the acquirer 18A, the analyzer 18B, the determiner 18C, a changer 19D, and the deliverer 18E. The controller 19 has the same configuration as that of the controller 18 in the support device 12 of the above-described embodiment, except for including the changer 19D in place of the changer 18D (see FIG. 2).

The changer 19D changes, on a message that has a possibility of causing confusion for users, the delivery mode of the message to a delivery mode that eliminates the confusion, as the same as that of the changer 18D.

In the second modification, the changer 19D includes a receiver 19G. The receiver 19G receives, on the message the acquirer 18A acquired subsequent to a message that has a possibility of causing confusion for users, the selection of another acquired message that configures a normal utterance pair with the message.

For example, when the determiner 18C distinguished a message acquired by the acquirer 18A as one that has a possibility of causing confusion for users, the receiver 19G controls the deliverer 18E so as to deliver, to the terminal device 14 of originating the message that the acquirer 18A newly acquired subsequent to the message, a plurality of acquired messages that can configure a normal utterance pair with the message, and the message.

The user of the terminal device 14 to which these messages were delivered inputs, by operating the operation device 30, selection information indicating which of the messages acquired by the support device 13 configures a normal utterance pair with the message originated by the terminal device 14. Then, the controller 26 of the terminal device 14 transmits the selection information to the support device 13.

The receiver 19G of the support device 13 receives, by receiving the selection information from the terminal device 14, the selection of the above-described other message.

Then, the changer 19D changes the delivery method so as to deliver the relevant information concerning the selected other message that has been received by the receiver 19G together with the message that has a possibility of causing confusion for users.

Thus, together with the message that has a possibility of causing confusion for users, the relevant information concerning the other message that configures a normal utterance pair with the message is delivered to each of the terminal devices 14.

By the above-described processing of the changer 19D, the support device 13 can obtain the same effect as that of the above-described embodiment.

Figure 10:
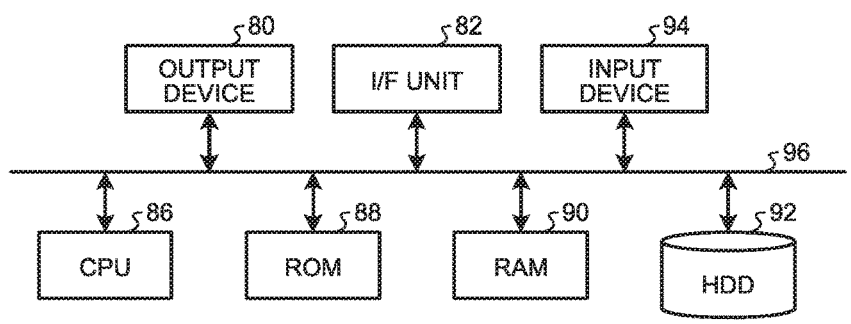
FIG. 10 is a block diagram illustrating an exemplary hardware configuration.

Next, the following describes a hardware configuration of the support device 12, the support device 13, and the terminal device 14 according to the above-described embodiment and modifications. FIG. 10 is a block diagram illustrating an exemplary hardware configuration of the support device 12, the support device 13, and the terminal device 14 according to the above-described embodiment and modifications.

The support device 12, the support device 13, and the terminal device 14 according to the above-described embodiment and modifications include an output device 80, an interface (I/F) unit 82, an input device 94, a central processing unit (CPU) 86, a read-only memory (ROM) 88, a random access memory (RAM) 90, and a hard disk drive (HDD) 92 that are connected to one another over a bus 96, and has a hardware configuration using a general computer.

The CPU 86 is a processor controlling the processing performed by each of the support device 12, the support device 13, and the terminal device 14 according to the above-described embodiment and modifications. The RAM 90 stores therein data necessary for various processing performed by the CPU 86. The ROM 88 stores therein computer programs or other data for implementing the various processing performed by the CPU 86. The HDD 92 stores therein data that are stored in the storage device 20 and the storage device 34 described above. The I/F unit 82 is an interface for exchanging data with another device. The I/F unit 82 corresponds to the communication I/F 22 and the communication I/F 24 described above.

The output device 80 corresponds to the output device 28 described above. The input device 94 corresponds to the operation device 30 and the input device 32 described above, and receives an operation instruction from a user and acquires data.

The computer programs for executing the various processing executed in the support device 12, the support device 13, and the terminal device 14 according to the above-described embodiment and modifications are incorporated and provided in the ROM 88 or the like in advance.

The computer programs executed in the support device 12, the support device 13, and the terminal device 14 according to the above-described embodiment and modifications may also be recorded and provided in a computer-readable recording medium such as a compact disc read-only memory (CD-ROM), a flexible disk (FD), a compact disc recordable (CD-R), and a digital versatile disc (DVD), as a file in a format installable or executable in these devices.

Furthermore, the computer programs executed in the support device 12, the support device 13, and the terminal device 14 according to the above-described embodiment and modifications may be stored in a computer connected to a network such as the Internet, and made available for download over the network. The computer programs for executing the above-described processing in the support device 12, the support device 13, and the terminal device 14 according to the above-described embodiment and modifications may also be provided or distributed over a network such as the Internet.

The computer programs for executing the above-described various processing executed in the support device 12, the support device 13, and the terminal device 14 according to the above-described embodiment and modifications can generate the units described above on the main memory.

The various information stored in the HDD 92 may also be stored in an external device. In such a case, the external device is connected to the CPU 86 over a network or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication support device that communicates with a plurality of terminal devices, the communication support device comprising a hardware processor configured to:
   receive from at least one of the plurality of terminal devices, messages in sequence in order of origination;
   change a predefined reference mode of one of the received messages to a changed mode for which a delivery timing and a delivery method are changed from the reference mode when the received message is not associated with a normal utterance pair that was determined from a preceding message received before the received message;
   determine an intention of the received message;
   determine, based at least in part on the intention of the received message, whether the received message is not associated with the normal utterance pair;
   store, at a storage device, normal utterance pair information in which an intention of the preceding message and an intention of a response message are associated in advance with each other as a second normal utterance pair that is associated with the preceding message;
   identify the received message as a message that is not associated with the normal utterance pair when the received message is not associated with the normal utterance pair that was determined from messages received before the received message, wherein the hardware processor changes the delivery mode on the received message so as to deliver the received message after keeping delivery of the received message on hold for a particular time period when the received message is identified as one that is not associated with the normal utterance pair; and
   deliver the received message to the plurality of terminal devices using the changed mode, wherein the plurality of terminal devices is divided into a plurality of groups, and wherein the processor delivers the received message at a different time for terminal devices belonging to each group.

2. The communication support device according to claim 1, wherein the hardware processor changes the delivery mode, when the received message is identified as one that is not associated with the normal utterance pair, so as to deliver identification information on the received message that associates the normal utterance pair with the received message identified as one that is not associated with the normal utterance pair out of other messages received before the received message, together with the message identified as one that is not associated with the normal utterance pair.

3. The communication support device according to claim 1, further comprising a receiver configured to receive, with a message received subsequent to the received message, selection of a second received message that associates a normal utterance pair with the received message when the received message has been identified as one that is not associated with the normal utterance pair, wherein the hardware processor changes the delivery mode so as to deliver relevant information concerning the second received message, and when the received message has been identified as one that causes confusion is not associated with the normal utterance pair.

4. A communication support method executed by a communication support device that communicates with a plurality of terminal devices, the communication support method comprising:
   receiving, from at least a terminal device of the plurality of terminal devices, messages in sequence in order of origination;
   changing a predefined reference mode of one of the received messages to a changed mode for which a delivery timing and a delivery method are changed from the reference mode when the first received message is not associated with a normal utterance pair that was determined from a preceding message received before the received message;
   determining an intention of the received message;
   determining, based at least in part on the intention of the received message, whether the received message is not associated with the normal utterance pair;
   storing, at a storage device, normal utterance pair information in which an intention of the preceding message and an intention of a response message are associated in advance with each other as a second normal utterance pair that is associated with the preceding message;
   identifying the received message as a message that is not associated with the normal utterance pair when the received message is not associated with the normal utterance pair that was determined from messages received before the received message, wherein the hardware processor changes the delivery mode on the received message so as to deliver the received message after keeping delivery of the received message on hold for a particular time period when the received message is identified as one that is not associated with the normal utterance pair; and
   delivering the received message to the plurality of terminal devices using the changed mode, wherein the plurality of terminal devices is divided into a plurality of groups, and wherein the hardware processor delivers the received message at a different time for terminal devices belonging to each group.

5. A computer program product having a non-transitory computer readable medium including programmed instructions, wherein the instructions, when executed by a computer that communicates with a plurality of terminal devices, cause the computer to perform:
   receiving, from at least a terminal device from the plurality of terminal devices, messages in sequence in order of origination;
   changing a predefined reference mode of one of the received messages to a changed mode for which a delivery timing and a delivery method are changed from the reference mode when the message is not associated with a normal utterance pair that was determined from a preceding message received before the received message;
   determining an intention of the received message;
   determining, based at least in part on the intention of the received message, whether the received message is not associated with the normal utterance pair;
   storing, at a storage device, normal utterance pair information in which an intention of the preceding message and an intention of a response message are associated in advance with each other as a second normal utterance pair that is associated with the preceding message;
   identifying the received message as a message that is not associated with the normal utterance pair when the received message is not associated with the normal utterance pair that was determined from messages received before the received message, wherein the hardware processor changes the delivery mode on the received message so as to deliver the received message after keeping delivery of the received message on hold for a particular time period when the received message is identified as one that is not associated with the normal utterance pair; and
   delivering the message to the plurality of terminal devices using the changed mode, wherein the plurality of terminal devices is divided into a plurality of groups, and wherein the hardware processor delivers the received message at a different time for terminal devices belonging to each group.

* * * * *